(12) United States Patent
Frick

(10) Patent No.: US 10,386,383 B2
(45) Date of Patent: Aug. 20, 2019

(54) WAVEGUIDE ARRANGEMENT FOR MEASURING THE SPEED OF A PROJECTILE DURING PASSAGE THROUGH A WEAPON BARREL ARRANGEMENT

(71) Applicant: RHEINMETALL AIR DEFENCE AG, Zurich (CH)

(72) Inventor: Henry Roger Frick, Hettlingen (CH)

(73) Assignee: Rheinmetall Air Defence AG, Zurich (CH)

( * ) Notice: Subject to any disclaimer, the term of this patent is extended or adjusted under 35 U.S.C. 154(b) by 67 days.

(21) Appl. No.: 15/549,235

(22) PCT Filed: Feb. 2, 2016

(86) PCT No.: PCT/EP2016/000161
§ 371 (c)(1),
(2) Date: Aug. 7, 2017

(87) PCT Pub. No.: WO2016/124325
PCT Pub. Date: Aug. 11, 2016

(65) Prior Publication Data
US 2018/0038883 A1 Feb. 8, 2018

(30) Foreign Application Priority Data
Feb. 6, 2015 (DE) .......... 10 2015 001 413

(51) Int. Cl.
*G01P 3/66* (2006.01)

(52) U.S. Cl.
CPC .................. *G01P 3/665* (2013.01)

(58) Field of Classification Search
CPC .... G01P 3/64; G01P 3/66; G01P 3/665; G01P 3/42; F41G 3/12; F41A 21/32; F42C 11/008; F42C 11/065; F42C 17/04
See application file for complete search history.

(56) References Cited

U.S. PATENT DOCUMENTS 3,918,061 A 11/1975 Elgaard
4,283,989 A * 8/1981 Toulios .................. F41A 21/32
342/104

(Continued)

FOREIGN PATENT DOCUMENTS

AT 389764 B 1/1990
DE 102006058375 A1 6/2008
(Continued)

*Primary Examiner* — Thang X Le
(74) *Attorney, Agent, or Firm* — Laurence A. Greenberg; Werner H. Stemer; Ralph E. Locher

(57) ABSTRACT

A waveguide arrangement for measuring the speed of a projectile during passage through a weapon barrel arrangement includes a main waveguide and at least one auxiliary waveguide. The main waveguide has a cross-section suitable for the passage of the projectile. The auxiliary waveguide extends adjacent to the main waveguide and is connected to the main waveguide via an opening. An isolator is arranged in the auxiliary waveguide. The waveguide arrangement is particularly suited for large-caliber ordinance and has at least one coupler extending at least partially in the isolator. The speed of the projectile in the main waveguide is measured at a frequency below the limiting frequency. The transmitting coupler is arranged at a spacing distance from the muzzle in order to prevent an exit of the generated signal from the weapon barrel arrangement.

13 Claims, 2 Drawing Sheets

(56) References Cited

U.S. PATENT DOCUMENTS

| | | | |
|---|---|---|---|
| 4,928,523 A | 5/1990 | Muhrer et al. | |
| 7,825,850 B2 | 11/2010 | Frick | |
| 8,305,071 B2 | 11/2012 | Frick | |
| 2004/0250615 A1 | 12/2004 | Alberti et al. | |
| 2008/0211710 A1* | 9/2008 | Frick | F41A 21/32 342/104 |
| 2009/0289619 A1* | 11/2009 | Frick | F41A 21/32 324/160 |
| 2014/0007760 A1* | 1/2014 | Frick | F41A 21/32 89/6.5 |
| 2014/0060297 A1* | 3/2014 | Frick | F41A 21/32 89/6.5 |

FOREIGN PATENT DOCUMENTS

| | | |
|---|---|---|
| DE | 102008024574 A1 | 6/2010 |
| EP | 1482311 A1 | 12/2004 |

* cited by examiner

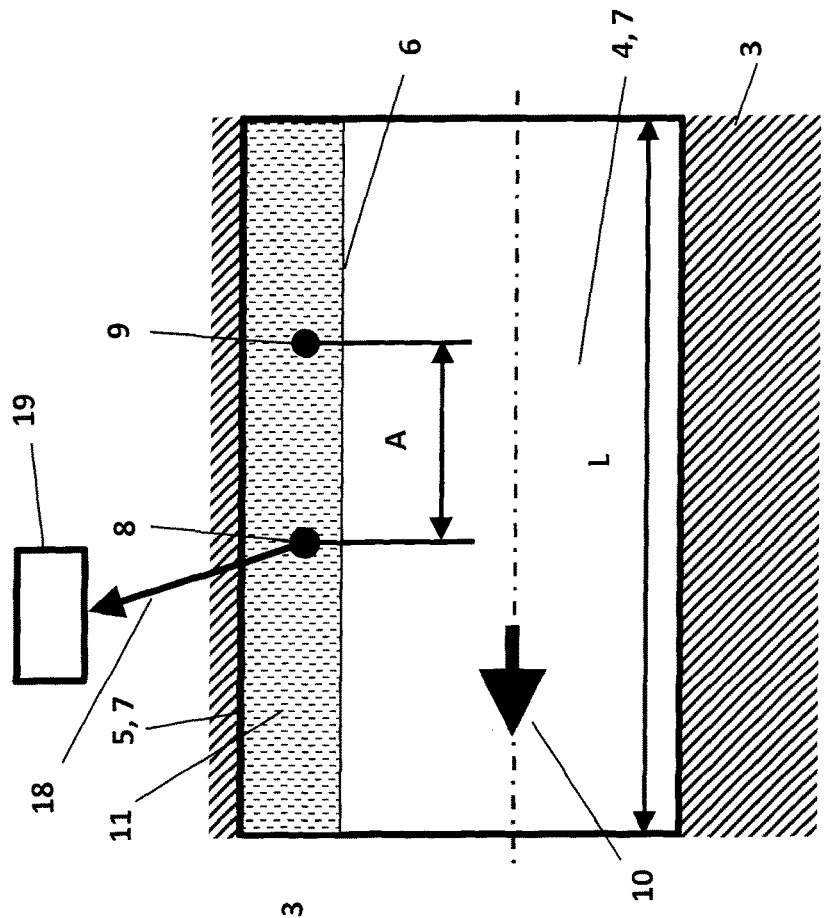
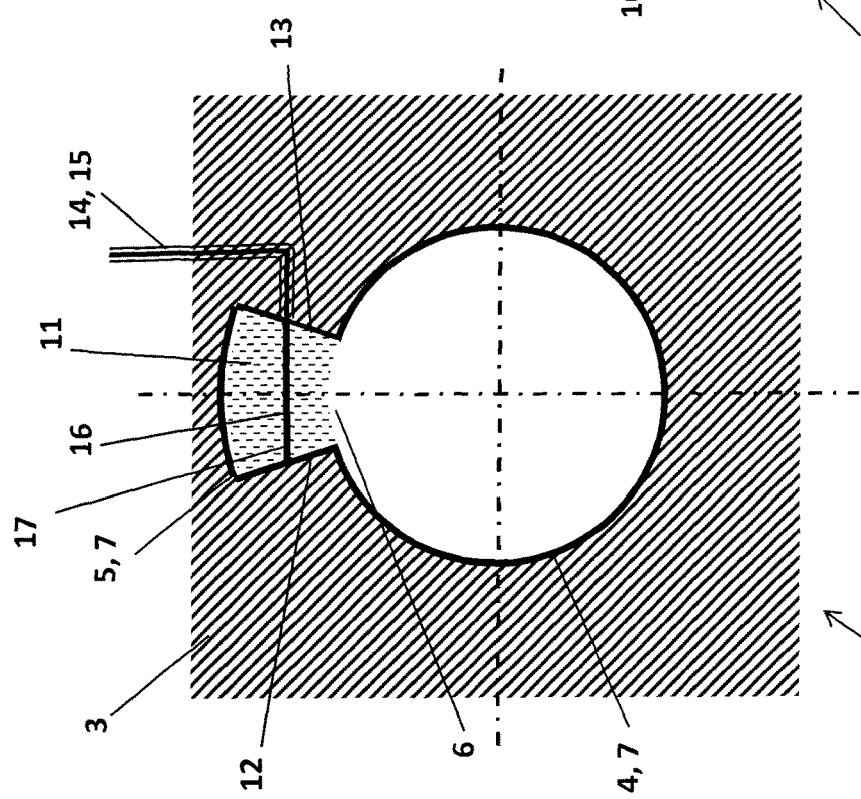

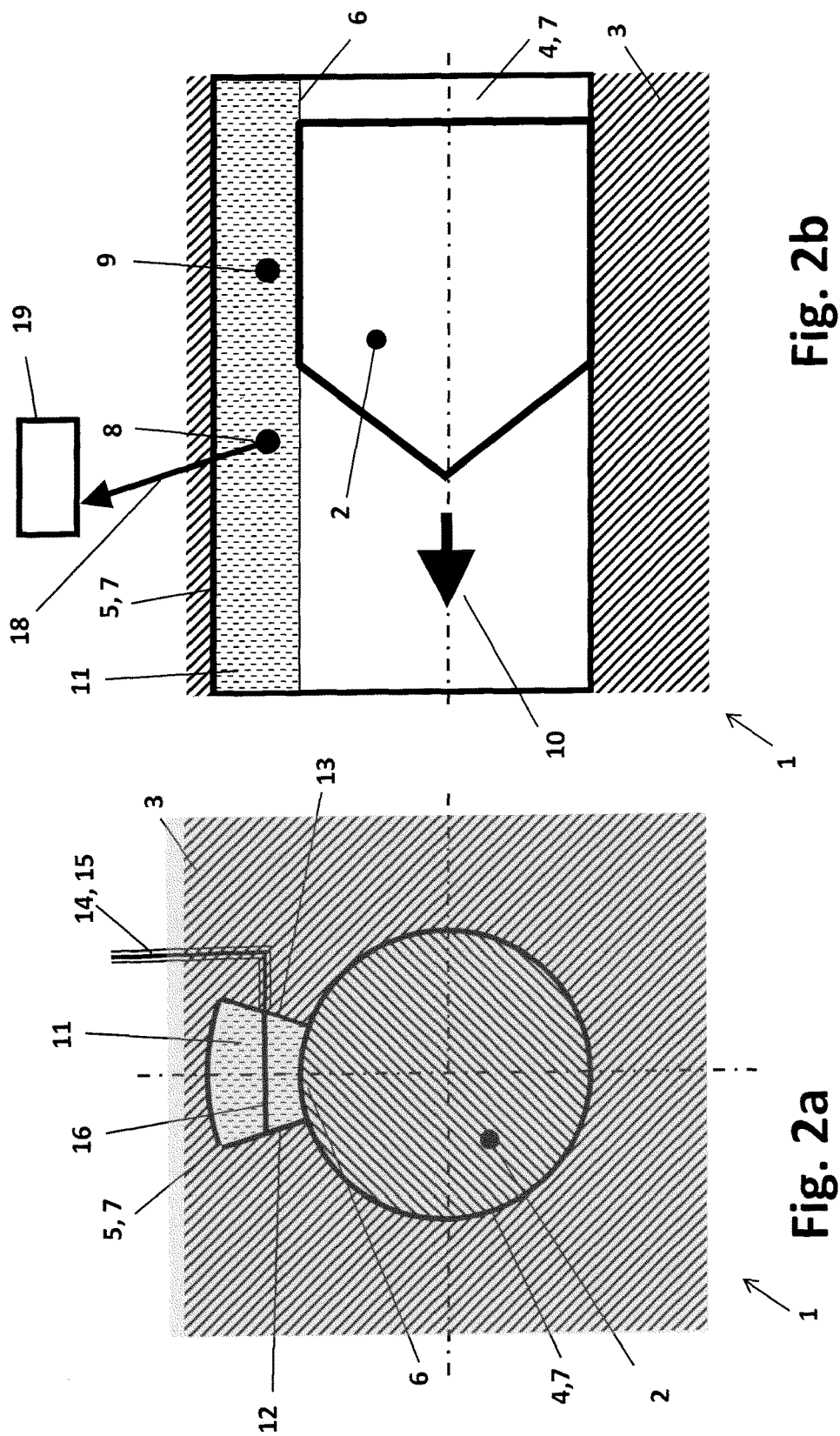

WAVEGUIDE ARRANGEMENT FOR MEASURING THE SPEED OF A PROJECTILE DURING PASSAGE THROUGH A WEAPON BARREL ARRANGEMENT

BACKGROUND OF THE INVENTION

Field of the Invention

The invention relates to a waveguide arrangement for measuring the speed of a projectile during passage through a weapon barrel arrangement.

The projectile is fired from a barreled weapon. The barreled weapon has a corresponding weapon barrel arrangement. If airburst munition is used, knowledge of the muzzle velocity that is as precise as possible is desirable in order to be able to determine the location of the airburst as precisely as possible. Airburst munition is used for example in medium-caliber guns. Even if munition without airburst is used, knowledge of the muzzle velocity is essential for predicting the flight path and the point of impact. Munition without airburst is used for example in howitzers, the howitzers potentially having for example a caliber of 155 mm.

Various methods and devices for measuring the speed of a projectile are known in the prior art.

It is known from U.S. Pat. No. 3,918,061 to measure the speed of a large-caliber artillery projectile by means of radar. In this case, after leaving the muzzle of a corresponding weapon barrel arrangement, the projectile is illuminated by means of radar. Part of the radar signal is reflected back to a radar device. By counting the Doppler oscillation produced by the projectile or by determining the Doppler shift of the radar signal, a measure of the projectile speed can be determined. Measuring the muzzle velocity for artillery shells by means of radar has the disadvantage that, if a number of howitzers in spatial proximity are firing almost simultaneously, the reflection signal of a first projectile can influence the measurement for a second projectile. Furthermore, the assignment of an individual projectile for a specific radar receiver is not always reliably possible.

Measuring the speed of the projectile in the region of the muzzle of the weapon barrel arrangement, in particular in the region of a muzzle brake, is particularly advantageous.

EP 1 482 311 A1 discloses a device and a method for determining the muzzle velocity of a projectile when it leaves the barrel of a weapon. The device comprises a coil, which is arranged around a longitudinal axis of the weapon barrel in the region before the exit and comprises a supply device for injecting a current into the coil in order to generate a magnetic field. The device additionally comprises an evaluation device, which picks off a voltage pulse at the coil, the voltage pulse being induced when the projectile passes through the magnetic field of the coil. Two given points of the voltage pulse are detected, the time interval between the two points is determined and the muzzle velocity of the projectile is calculated from the time interval.

It is also known to measure the speed of the projectile in the region of the muzzle brake by means of a field within a waveguide by means of a waveguide arrangement. The waveguide is in this case operated below its cut-off frequency. The field used in this case is highly concentrated in the waveguide and therefore emerges from the waveguide only little.

DE 10 2008 024 574 A1 discloses a waveguide arrangement for measuring the speed of a projectile during passage through a weapon barrel arrangement, a smooth barrel being used here as the waveguide. A transmitting coupler and a receiving coupler are provided, the transmitting coupler and the receiving coupler being incorporated in the waveguide.

DE 10 2006 058 375 A1 discloses a waveguide arrangement for measuring the muzzle velocity. Here, a weapon barrel and/or parts of a muzzle brake are used as the waveguide. The waveguide has in this case a main waveguide with a circular cross section. The projectile passes through the main waveguide. The complete waveguide arrangement in this case has a cross section that is not exactly circular but has a profiling such that a multiplicity of auxiliary waveguides are formed by a rib structure on the waveguide wall. This rib structure serves the purpose that a certain waveguide mode is induced. The rib structure delimits twelve intermediate spaces extending in the longitudinal direction, these intermediate spaces respectively forming an auxiliary waveguide. The auxiliary waveguides extend alongside the main waveguide and are connected to the main waveguide by way of corresponding slit-shaped openings. Couplers are arranged in some of the auxiliary waveguides; no couplers are arranged in the remaining auxiliary waveguides. A receiving coupler serves for picking up the signal and is connected to a receiving unit by way of a cable for the received signal. A transmitting coupler serves for inducing the corresponding waveguide mode. An oscillator induces the waveguide mode by way of the transmitting coupler. The frequency in this case lies below the cut-off frequency of the waveguide.

AT 389 764 B discloses a weapon barrel, an electromagnetic wave being divided and coupled in at two points on the weapon barrel by way of a waveguide junction and, after reflection at the projectile located in the weapon barrel, coupled out again. Corresponding propagation of the wave with reflection only takes place in a pronounced waveguide mode that lies at a frequency above the cut-off frequency of the waveguide. Together with the coupling openings, the waveguide junction in this case forms an auxiliary waveguide. The corresponding coupling openings can be closed off with low dielectric losses by means of electrically nonconductive closures.

The generically determinative U.S. Pat. No. 4,283,989 discloses an anti-aircraft gun with a weapon barrel. The weapon barrel serves as a main waveguide. Arranged near the muzzle is a measuring head, which is connected to a microwave generator or oscillator in order to induce an electromagnetic mode in the weapon barrel. The measuring head also serves the purpose of determining a Doppler frequency signal, which serves for determining the speed of the projectile. The measuring head is arranged in the region of a muzzle brake of the weapon barrel and reaches through a substantially radially extending bore of the muzzle brake. The measuring head has a housing, a housing region of the housing being arranged outside the muzzle brake and an inner housing region of the housing engaging in a bore. The tubular housing regions delimit a cylindrical opening.

Arranged within this opening is a cylindrical dielectric insert. This insert consists of a glass-ceramic material. The outer housing region has an opening, through which a conductor is pushed into an opening in the insert that extends in the radial direction. This opening is intended to be arranged at a distance of about one quarter wavelength away from an outer surface on the end face. The insert is intended to serve the purpose of being able to guide the corresponding waves better through the measuring head. There is also an auxiliary waveguide extending along the weapon barrel. The auxiliary waveguide is filled with a dielectric. This auxiliary waveguide is connected to the measuring head by way of a connection and a coaxial cable. As long as the projectile is in the barrel or in the region of the muzzle brake, the oscillator is operated at a frequency above the waveguide cut-off frequency. The measurement consequently takes place with a fundamental mode above the cut-off frequency of the waveguide as long as the projectile is within the barrel. After the projectile leaves the weapon barrel, a frequency below the cut-off frequency of the weapon barrel is used for the measurement and interaction with the projectile, the field being radiated from the gun to the projectile.

The generically determinative prior art is not yet optimally formed. The measurement of the muzzle velocity, in particular of artillery shells, by means of a corresponding waveguide arrangement is technologically possible but may give rise to material-related and assembly-related difficulties. The couplers used must be protected from the effects of the combustion gases. Furthermore, the waveguide arrangement must be designed to withstand corresponding shock loading. Moreover, the radiation of the signal has the disadvantage that the gun can be discovered more easily by enemy troops.

SUMMARY OF THE INVENTION

The invention is therefore based on the object of designing and developing the waveguide arrangement mentioned at the beginning in such a way that an improved waveguide arrangement is provided, in particular for large-caliber guns.

This object on which the invention is based is achieved by a waveguide arrangement with the features as claimed. An isolator of an isolator material is arranged in the auxiliary waveguide, the at least one coupler extending at least partially in the isolator material. This has the advantage that the couplers, in particular at least one receiving coupler and at least one transmitting coupler, are protected from the combustion gases in a simple and inexpensive way. The fact that no rings or the like have to be produced from the isolator means that only a relatively small material requirement is necessary for producing the isolator. One or more isolators may be respectively arranged in the auxiliary waveguide. In a preferred design, an isolator is arranged in each auxiliary waveguide.

The speed of the projectile located in the main waveguide is measured at a frequency below the cut-off frequency. The signal is generated at a frequency below a cut-off frequency while the projectile is still in the weapon barrel, to be specific in the main waveguide. The transmitting coupler is in this case arranged at a distance from the muzzle such that the field does not emerge from the weapon barrel. This has the advantage that no field is radiated out into the surroundings of the gun, and so the field is concentrated exclusively in the waveguide. Therefore, the risk of the gun being discovered and located by enemy troops during the measurement of the speed because of an emerging field is reduced. The field generated decays exponentially in the weapon barrel. The distance of the transmitting coupler and the receiving coupler in the longitudinal direction is therefore small in order to be able to measure a corresponding difference in the signal level.

In order to achieve a higher received signal level, a number of auxiliary waveguides with corresponding receiving couplers may be provided. In one design, just one auxiliary waveguide is provided. In a particularly preferred design, four auxiliary waveguides or fewer than four auxiliary waveguides are provided. This reduces the material requirement for the isolator. If a number of auxiliary waveguides are provided, the auxiliary waveguides are preferably spaced apart uniformly from one another in the circumferential direction, in order to achieve a mass distribution that is as uniform as possible. In the case of four auxiliary waveguides, they are preferably spaced apart from one another by 90°. In the case of three auxiliary waveguides, they are preferably spaced apart from one another by 120°. In the case of two auxiliary waveguides, they are preferably spaced apart from one another by 180°. In particular, at least one coupler is arranged in each auxiliary waveguide. In particular, at least one transmitting coupler and at least one receiving coupler are respectively arranged in the corresponding auxiliary waveguides. The isolator material preferably comprises a ceramic material. The isolator material is formed by one or more workpieces.

The isolator material is preferably arranged in the auxiliary waveguide in a form-fitting manner. The cross section of the isolator material is adapted to the cross section of the auxiliary waveguide. The isolator material preferably fills the auxiliary waveguide for the most part, preferably completely. The cross section of the auxiliary waveguide may in particular extend conically radially outward, so that, with its matching conically extending side walls, the isolator material is held in the auxiliary waveguide in a form-fitting manner.

The waveguide arrangement according to the invention provides that the projectile is guided in a main waveguide. The main waveguide has an inner transverse dimension that corresponds substantially to the diameter of the projectile. This is the preferred measure, to keep the transverse dimension of the main waveguide as small as possible and minimize it to the installation size of the waveguide arrangement. The main waveguide is adapted to the caliber of the weapon barrel arrangement. The main waveguide may in particular have a substantially circular cross section. The main waveguide guides the projectile. The waveguide arrangement is suitable in particular for large-caliber artillery guns. The main waveguide preferably has such a diameter that projectiles with a caliber of 70 mm or more than 70 mm can pass through the main waveguide. The main waveguide preferably has a diameter for receiving projectiles with the caliber of 155 mm. The diameter of the main waveguide is in particular more than 150 mm, preferably substantially 155 mm.

In particular if only one or two auxiliary waveguides are provided for example, a waveguide arrangement that is simple and can be produced inexpensively can be provided also for such large calibers. The production and handling of the corresponding isolators or isolator material components is inexpensive.

Furthermore, it is advantageous that, in the production of correspondingly smaller isolators, there is a reduced risk that defects can occur in the isolator during the ceramic production. They could reduce the strength. Therefore, the waveguide arrangement proposed here has the advantage that the strength of the isolator is improved.

The at least one auxiliary waveguide extends parallel to the main waveguide. The transverse dimensions of the auxiliary waveguide can to a certain extent be freely chosen, but should preferably be much smaller than those of the main waveguide in order not to increase the installation size of the waveguide arrangement unnecessarily and also to keep the size of the isolators small. The main waveguide and the auxiliary waveguide are arranged or formed lying directly next to one another and adjacent to one another and have a common opening, which connects the two waveguides over their entire length.

Consequently, the main waveguide and the auxiliary waveguide communicate with one another through the electromagnetic field that is generated in the auxiliary waveguide. The auxiliary waveguide is preferably filled with the isolator and contains the transmitting coupler and the receiving coupler. This measure allows the overall size and the amount of material necessary for the production of the isolator to be minimized.

The number and arrangement of the auxiliary waveguides is not chosen with regard to mode selection. The auxiliary waveguides may be spaced apart uniformly or non-uniformly. The arrangement of the auxiliary waveguides is determined by the signal quality and by the overall size. Multiple waveguide modes are permitted. The measurement is not dependent on only one waveguide mode being induced. The signal is measured with the receiving coupler and the speed is measured on the basis of the change in the signal or the variation over time.

The installation of the corresponding couplers in the isolator is inexpensive and simple. The coupler may be formed as a coaxial conductor with an inner conductor and an outer conductor. The outer conductor is preferably connected in a conducting manner to the auxiliary waveguide. The outer conductor may in this case be connected to the auxiliary waveguide from the outside. This is a simple and inexpensive method. The inner conductor is preferably led into a bore or into a channel in the isolator. This is a particularly simple and inexpensive way of arranging and assembling the transmitting coupler or the receiving coupler. Here, the transmitting coupler and the receiving coupler have a coaxial line, from which the exposed inner conductor is respectively pushed from outside into an intended bore in the isolator. The inner conductor may be fastened to the auxiliary waveguide. This dispenses with the laborious installation of the couplers in the isolator. Forming the couplers in this way achieves a high immunity to interference from outside fields. The waveguide arrangement is shielded. It is also advantageous that no emissions reach the outside because the electromagnetic field is concentrated inside. Enemy reconnaissance systems therefore cannot detect the presence of the waveguide arrangement.

The disadvantages mentioned at the beginning are therefore avoided and corresponding advantages are achieved.

There are then a great number of possibilities for designing and developing the waveguide arrangement according to the invention in an advantageous way. For this, reference may be made firstly to the dependent patent claims. A preferred design of the invention is explained in more detail below on the basis of the drawing and the associated description.

BRIEF DESCRIPTION OF THE SEVERAL VIEWS OF THE DRAWING

In the drawing:

FIG. 1a shows a waveguide arrangement suitable for measuring the speed without a projectile in a transversely sectioned, schematic representation, FIG. 1b shows the waveguide arrangement without a projectile in a schematic, longitudinally sectioned representation, FIG. 2a shows the waveguide arrangement with the projectile in a schematic, transversely sectioned representation, and FIG. 2b shows the waveguide arrangement with the projectile in a schematic, longitudinally sectioned representation.

DESCRIPTION OF THE INVENTION

In FIGS. 1a, 1b, 2a and 2b, a waveguide arrangement 1 for measuring the speed of a projectile 2 (cf. FIGS. 2a, 2b) can be seen.

The waveguide arrangement 1 is part of a weapon barrel arrangement that is not represented in its entirety. The waveguide arrangement 1 forms a measuring section that is not designated any more specifically. In particular, the waveguide arrangement 1 is arranged at the muzzle of a weapon barrel. The waveguide arrangement 1 is arranged in particular between the muzzle of the weapon barrel and a corresponding muzzle brake. The waveguide arrangement 1 may be part of the muzzle brake.

The waveguide arrangement 1 has a main body 3. The waveguide arrangement 1 has a main waveguide 4 and an auxiliary waveguide 5. The main waveguide 4, the auxiliary waveguide 5 and the main body 3 consist in particular of a conductive material, in particular metal. It is alternatively conceivable that the main body 3 has an insert which forms the main waveguide 4 and/or the auxiliary waveguide 5. The main body 3 may in particular be of a tubular form. In the transversely sectioned representations in FIGS. 1a and 2a, only a rectangular detail is shown here, but it is conceivable that the main body 3 has a cylindrical outer circumferential surface. The projectile 2 leaving the weapon barrel then enters the main waveguide 4, as represented in particular in FIG. 2a and FIG. 2b. The main waveguide 4 has a substantially circular cross section, the cross section being adapted to the size of the projectile 2 to be fired.

The main waveguide 4 has in particular a cross section of 70 mm or of more than 70 mm. The main waveguide 4 is suitable in particular for measuring the speeds of artillery projectiles with corresponding large calibers. During firing of the projectile 2, the waveguide arrangement 1 is exposed to strong shock effects and the effect of corresponding combustion gases. Therefore, a structure that is on the one hand robust and on the other hand can be produced inexpensively is proposed.

At least one auxiliary waveguide 5 is connected to the main waveguide 4. The main waveguide 4 is in this case connected to the auxiliary waveguide 5 by way of an opening 6. The main waveguide 4 and the auxiliary waveguide 5 extend parallel to one another, as can be seen in particular in FIG. 1b. The opening 6 preferably extends over the entire length L of the waveguide. The opening 6 is formed here by a slit extending in the longitudinal direction. As a result of the opening 6, the main waveguide 4 and the auxiliary waveguide 5 together form a complete waveguide 7. The complete waveguide 7 has here the cross-sectional form of a keyhole. The complete waveguide 7, or here the corresponding main body 3, has an electrical conductivity that is good overall.

A number of couplers 8, 9, to be specific a transmitting coupler 9 and a receiving coupler 8, are arranged in the region of the auxiliary waveguide 5. Even if a number of auxiliary waveguides 5 are provided, at least one transmitting coupler 9 and at least one receiving coupler 8 are respectively arranged together in at least one of the auxiliary waveguides 5. Preferably, at least one pair consisting of a transmitting coupler 9 and a receiving coupler 8 is provided in each of the auxiliary waveguides 5. There may however also be a number of receiving couplers 8 and/or a number of transmitting couplers 9 respectively arranged in the auxiliary waveguide 5 or in the auxiliary waveguides 5. The receiving coupler 8 and the transmitting coupler 9 are arranged spaced apart from one another at a distance A, seen in the longitudinal direction. The distance A should be chosen such that the difference in the signal level in the cases with and without the projectile 2 is optimal for speed determination. The sequence between the transmitting coupler 9 and the receiving coupler 8 with respect to the firing direction 10 may be reversed. Furthermore, the distance A may also be equal to zero, the transmitting coupler 9 and the receiving coupler 8 coinciding in the longitudinal direction. It is also possible to repeat the arrangement of the couplers 8, 9 a number of times along the firing direction in order to improve the accuracy and the robustness of the speed measurement.

The transmitting coupler 9 transmits a signal at a frequency f0, which lies below a cut-off frequency fc of the complete waveguide 7. The electromagnetic field generated by the transmitted signal of the frequency f0 propagates in the auxiliary waveguide 5 and leaves by way of the opening 6 also in the main waveguide 4. In this sense, the auxiliary waveguide 5 communicates with the main waveguide 4.

If a number of transmitting couplers 9 and receiving couplers 8 are arranged one after the other in the firing direction 10, each transmitting coupler 9 may be assigned a different frequency f01, f02, . . . etc., all of the chosen frequencies f0, f01, f02, . . . etc. lying below the cut-off frequency fc of the complete waveguide 7. It should be noted that, also for the auxiliary waveguide 5, the frequency f0 or the frequencies f01, f02, . . . of the transmitted signal or the transmitted signals also come to lie below its cut-off frequency fcn.

An isolator 11 of an isolator material is arranged in the auxiliary waveguide 5, the coupler 8, 9 extending at least partially in the isolator 11. The auxiliary waveguide 5 is preferably filled up to the opening 6 with the isolator 11. Preferably, the predominant part, i.e. more than 50%, in particular more than 75%, preferably more than 90%, of the auxiliary waveguide 5 is filled with the isolator 11. The isolator 11 has the advantage that the two couplers 8, 9 are well protected from the corresponding combustion gases.

In a particularly preferred design, the isolator 11 is arranged in the auxiliary waveguide 5 in a form-fitting manner. The cross section of the auxiliary waveguide 5 has the form of a segment of a circular ring, the flanks 12, 13 being further spaced apart from one another in the circumferential direction seen outwardly than at the opening 6. The flanks 12, 13 are substantially conical in relation to one another. The flanks 12, 13 preferably extend in the radial direction and in the longitudinal direction. Since the form of the auxiliary waveguide 5 and of the isolator 11 tapers radially toward the center of the waveguide arrangement 1, secure retention of the isolator 11 in the auxiliary waveguide 5 is ensured and the isolator 11 cannot get into the open region of the main waveguide 4 and fill it entirely or partially, and thereby block passage of the projectile 2. The bottom, not designated any more specifically, of the auxiliary waveguide 5, between the flanks 12, 13, may be curved in the form of a circular arc or be formed in a planar manner, which may depend on the method of production of the auxiliary waveguide 5. The isolator 11 preferably lies against the bottom of the auxiliary waveguide 5, and is thereby supported.

The cross section of the auxiliary waveguide 5 is significantly smaller than the cross section of the main waveguide 4. Even if a number of auxiliary waveguides 5 are provided, the overall cross section of all the auxiliary waveguides 5 is significantly smaller than the cross section of the main waveguide 4. This has the advantage that the isolators 11 can be formed as correspondingly small. In particular, the isolator 11 is produced from a ceramic material. There is a reduced risk that defects are formed to an increased extent in the material during the production of the corresponding ceramic parts, and therefore that the strength could be reduced. The installation of the isolator 11 is simple and inexpensive.

The main waveguide 4 guides the projectile 2. Consequently, the main waveguide 4 has the inner transverse dimension of the projectile 2. This is the preferred measure, to keep the transverse dimension of the main waveguide 4 as small as possible, and this measure helps to minimize the installation size of the waveguide arrangement 1. The auxiliary waveguide 5 extends parallel to the main waveguide 4. The transverse dimension of the auxiliary waveguide 5 can be freely chosen to a certain extent, but should preferably be much smaller than that of the main waveguide 4, in order not to increase the installation size of the corresponding measuring section or of the waveguide arrangement 1 unnecessarily. The auxiliary waveguide 5 may have different cross-sectional forms, for example the form of a segment of a circle as it is represented. Alternatively, the auxiliary waveguide 5 may have other cross-sectional forms, for example polygonal, triangular, rectangular, square, circular, oval or the like, the auxiliary waveguide 5 being connected to the main waveguide 4 by way of a corresponding opening 6.

A preferred design of the two couplers 8, 9, to be specific the receiving coupler 8 and the transmitting coupler 9, shall be described in more detail below. Each of these two couplers 8, 9 preferably has a coaxial conductor 14. The coaxial conductor 14 is connected from the outside to the auxiliary waveguide 5. The coaxial conductor 14 has an outer conductor 15, the outer conductor 15 being correspondingly connected from the outside to the auxiliary waveguide 5. The coaxial conductor 14 also has an inner conductor 16. The inner conductor 16 extends up to a receptacle 17 in the isolator 11. The isolator 11 has a receptacle 17 respectively for each receiving coupler 8 and transmitting coupler 9. In a particularly preferred design, the receptacle 17 is formed as a bore. The bore or receptacle 17 extends transversely in relation to the longitudinal direction of the waveguide arrangement 1. The outer conductor 15 is connected in particular in a conducting manner to the waveguide wall 13. In one design, the free end of the inner conductor 16 may be connected in a conducting manner to the opposite waveguide wall 12. This design produces a short circuit between the outer conductor 15 and the inner conductor 16 because they are connected to one another by way of the conducting waveguide walls 12, 13 or by way of the conducting auxiliary waveguide 5. Nevertheless, this arrangement can be used for measuring a field that is variable over time in the auxiliary waveguide 5, because the outer conductor 15, the inner conductor 16 and the auxiliary waveguide 5 form a kind of coil that is permeated by the corresponding field. The induced signal change is governed by the Maxwell equations.

In an alternative design, the inner conductor 16 is not connected to the opposite waveguide wall 12, but ends at a distance from the waveguide wall 12. As a result, a capacitive resistance is obtained between the inner conductor 16 and the waveguide wall 12. The intermediate space between the end of the inner conductor 16 and the waveguide wall 12 is in particular filled with the isolator material or the isolator 11.

The transmitting coupler 9 is arranged at a distance from a muzzle of the weapon barrel arrangement, in order to prevent the signal generated from leaving the weapon barrel arrangement. The length L of the waveguide is chosen such that virtually no electromagnetic field is measurable at the two ends. By this measure, on the one hand the waveguide arrangement 1 does not radiate any measurable energy and on the other hand it is robust with respect to external interference signals at frequencies below the waveguide frequency fc.

A received signal 18 is then sent by the receiving coupler 8 to a filter 19. With the filter 19, signal components that lie above the cut-off frequency of the complete waveguide 7 and/or of the auxiliary waveguide 5 can be filtered. The filter 19 serves the purpose of blocking external interference signals at frequencies that are at the same level or above the waveguide frequency fc in the received signal 18.

FIGS. 2a and 2b shall be discussed in more detail below. As can be seen well, the cross section of the projectile 2 fills the cross section of the main waveguide 4. This can be achieved if the inside diameter of the main waveguide 4 is of the same size as or somewhat greater than the outside diameter of the driving band of the shell or the projectile 2. The opening 6 is then partially or entirely closed by the outer casing of the projectile 2. The existing electromagnetic field is consequently subjected to a boundary condition that changes over time over the opening 6. The boundary condition that changes over time over the opening 6 has the effect that the electromagnetic field distribution in the auxiliary waveguide 5 changes over time. This change in the field over time is received by the receiving coupler 8 and the received signal 18 is passed on to the speed determination. The received signal 18 has a characteristic variation over time when the projectile 2 passes through the main waveguide 5 in the firing direction 10. This variation over time allows the speed to be determined.

The proposed waveguide arrangement 1 yields a number of advantages. Only if the auxiliary waveguide 5 is filled with the isolator 11 and the main waveguide 4 is greater than the transverse dimension in the transverse dimension of the auxiliary waveguide 5 can the dimensions of the isolator 11 be kept small. The inside diameter of the main waveguide 4 corresponds to the outside diameter of the projectile 2 and the inside diameter of the main waveguide 4 is consequently minimal. The transverse dimensions of the auxiliary waveguide 5 should be chosen to be small, in order to minimize the overall installation size of the waveguide arrangement 1 or of the corresponding measuring section. As a result, the required installation dimensions can be readily maintained.

The production and handling of large isolator components is avoided, whereby the production costs of the measuring section are lowered. Since only the auxiliary waveguide 5 is filled with the isolator 11, the amount of isolator material is minimal. This reduces the costs. The production, in particular of ceramic parts as isolators 11 of these sizes, can lead to the increased formation of defects in the material and reduce the strength. Since, however, here only the auxiliary waveguide 5 is filled with the ceramic material, the amount of isolator material is small, the corresponding dimensions are small and the formation of defects can be reduced. The installation of the couplers 8, 9, in particular the receiving coupler 8 or the transmitting coupler 9, is simple and inexpensive. The construction of the transmitting coupler 9 and/or the receiving coupler 8 consists substantially only of the inner conductor 16 of a corresponding coaxial cable, which is led from the outside in an intended bore into the isolator 11. The coaxial cable is connected by its outer conductor 15 from the outside to the auxiliary waveguide 5. This is a simple and low-cost structure, the interference integrity being increased. The main application of the waveguide arrangement 1 proposed here is as a device for measuring the muzzle velocity, for which no programming of the projectile 2 is required, for example in the case of large-caliber artillery munition and/or howitzers. However, it is also conceivable that, with the waveguide arrangement 1, a programming of the projectile 2 is performed.

However, it is conceivable that such a waveguide arrangement 1 is likewise used for example for medium-caliber guns of 30 mm or 35 mm. In particular, the waveguide arrangement 1 may be used for muzzle velocity measurements in the large-caliber range, in particular for measuring the muzzle velocity of projectiles 2 with a caliber of 155 mm.

LIST OF DESIGNATIONS

1 Waveguide arrangement
2 Projectile
3 Main body
4 Main waveguide
5 Auxiliary waveguide
6 Opening
7 Complete waveguide
8 Receiving coupler
9 Transmitting coupler
10 Firing direction
11 Isolator
12 Waveguide wall
13 Waveguide wall
14 Coaxial conductor
15 Outer conductor
16 Inner conductor
17 Receptacle
18 Received signal
19 Filter
L Length of waveguide
A Distance

The invention claimed is:

1. A waveguide arrangement for measuring a speed of a projectile passing through a weapon barrel arrangement having a muzzle, the waveguide arrangement comprising:
   a main waveguide having a cross section suitable for a passage of the projectile;
   an auxiliary waveguide extending alongside said main waveguide and connected to said main waveguide by way of an opening;
   an isolator produced from an isolator material disposed in said auxiliary waveguide;
   at least one coupler extending at least partially in said isolator in said auxiliary waveguide, said at least one coupler being a coaxial conductor with an inner conductor and an outer conductor, said outer conductor being connected to said auxiliary waveguide, and said outer conductor being connected from that outside to said auxiliary waveguide; and
   said at least one coupler including a transmitting coupler configured to generate a signal having a frequency below a cut-off frequency of said auxiliary waveguide and below a cut-off frequency of a complete waveguide formed of said main waveguide and said auxiliary waveguide;
   wherein the speed of the projectile located in said main waveguide can be measured at a frequency below the cut-off frequency, wherein the transmitting coupler is arranged at a spacing distance from the muzzle of the weapon barrel arrangement, in order to prevent the signal generated from leaving the weapon barrel arrangement.

2. The waveguide arrangement according to claim 1, wherein said isolator is arranged in the auxiliary waveguide with a form-fit.

3. The waveguide arrangement according to claim 1, wherein said isolator comprises a ceramic material.

4. The waveguide arrangement according to claim 1, wherein said main waveguide has a circular cross section with a diameter of 70 mm or more than 70 mm.

5. The waveguide arrangement according to claim 4, wherein said diameter is greater than 150 mm.

6. The waveguide arrangement according to claim 1, wherein said auxiliary waveguide is one of fewer than three auxiliary waveguides.

7. The waveguide arrangement according to claim 1, wherein said one auxiliary waveguide is a single auxiliary waveguide.

8. The waveguide arrangement according to claim 1, wherein at least one of said auxiliary waveguides is assigned at least one said transmitting coupler and at least one receiving coupler.

9. The waveguide arrangement according to claim 1, which comprises a filter configured to receive a signal from said receiving coupler, said filter being configured to filter out signal components above the cut-off frequency of said complete waveguide and/or of said auxiliary waveguide.

10. A method for measuring a speed of a projectile through a weapon barrel arrangement, the method comprising:
providing a waveguide arrangement according to claim 1;
passing a projectile through the main waveguide;
measuring the speed of the projectile in the main waveguide at a frequency below the cut-off frequency of the auxiliary waveguide and below a cut-off frequency of the waveguide arrangement.

11. The waveguide arrangement according to claim 1, wherein said inner conductor extends up to a receptable in said isolator.

12. The waveguide arrangement according to claim 11, wherein said receptable is formed as a bore.

13. The waveguide arrangement according to claim 11, wherein said receptable extends transversely to the longitudinal direction of the waveguide arrangement.

* * * * *